United States Patent [19]
Olivieri et al.

[11] Patent Number: 6,100,607
[45] Date of Patent: Aug. 8, 2000

[54] SAFETY METHOD AND DEVICE FOR FULL-VOLTAGE POWER SUPPLY TO A USER APPARATUS ONLY WHEN REQUIRED, AND CONTROL ASSEMBLY COMPRISING SUCH A SAFETY DEVICE

[75] Inventors: Daniele Olivieri, San Giuliano Milanese; Massimo Brambilla, Inzago; Paolo Delgrossi, Monza, all of Italy

[73] Assignee: Compact S.r.l., Italy

[21] Appl. No.: 09/102,440

[22] Filed: May 22, 1998

[30] Foreign Application Priority Data

Jun. 26, 1997 [IT] Italy .................................. MI97A1513

[51] Int. Cl.[7] .................................. H02J 9/04; H02J 3/00
[52] U.S. Cl. .......................... 307/125; 307/86; 307/326; 307/116; 307/64; 361/171
[58] Field of Search ........................ 395/750.01, 750.03, 395/750.06; 364/187; 307/64, 66, 86, 326, 115, 116, 127, 129, 139; 361/171, 185, 186, 188

[56] References Cited

U.S. PATENT DOCUMENTS

| | | | |
|---|---|---|---|
| 5,029,037 | 7/1991 | Bartelink | 361/49 |
| 5,151,841 | 9/1992 | Knights | 361/86 |
| 5,642,004 | 6/1997 | Bircher | 307/66 |

*Primary Examiner*—Jeffrey Gaffin
*Assistant Examiner*—Roberto Rios
*Attorney, Agent, or Firm*—Shlesinger, Fitzsimmons & Shlesinger

[57] ABSTRACT

A method of detecting a condition requiring connection of a user apparatus with a feeder line comprises the steps of low-voltage power supplying the user apparatus through a detection impedance (17, 17a); detecting the waveform at the ends of the detection impedance; operating connection of the user apparatus with the feeder line when the waveform at the ends of the detection impedance is distorted in a manner that has been pre-established to be caused by actuation of a command in the user apparatus and requiring full powering of same. A device in accordance with the method comprises an analysis circuit (19, 37) detecting (by comparison with sample waveforms stored in a memory (20), for example) distortion of the waveform at the ends of the impedance (17, 17a) and consequently operating powering of the user apparatus.

19 Claims, 3 Drawing Sheets

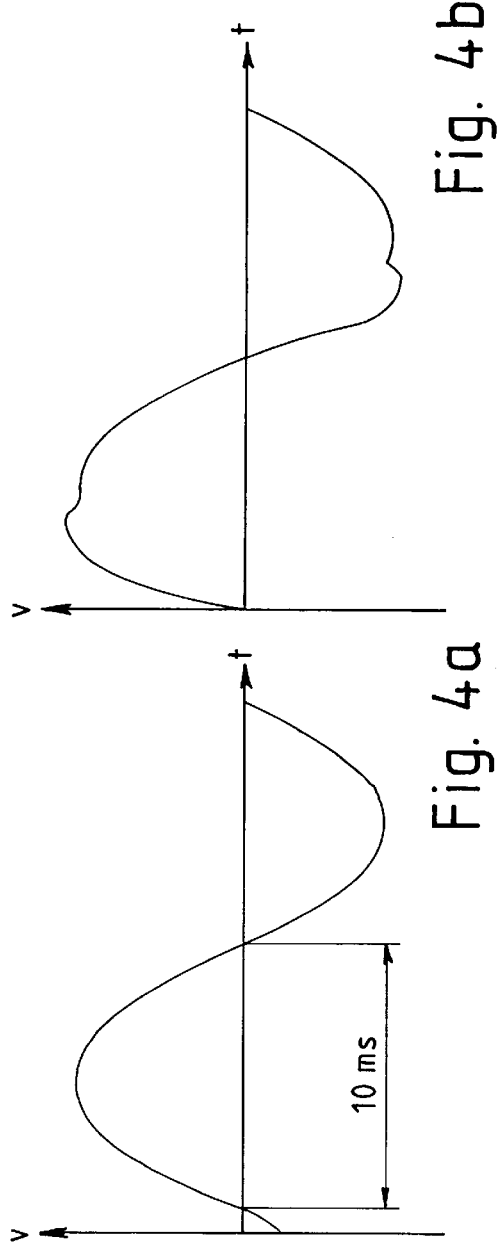
Fig. 4b
Fig. 4a
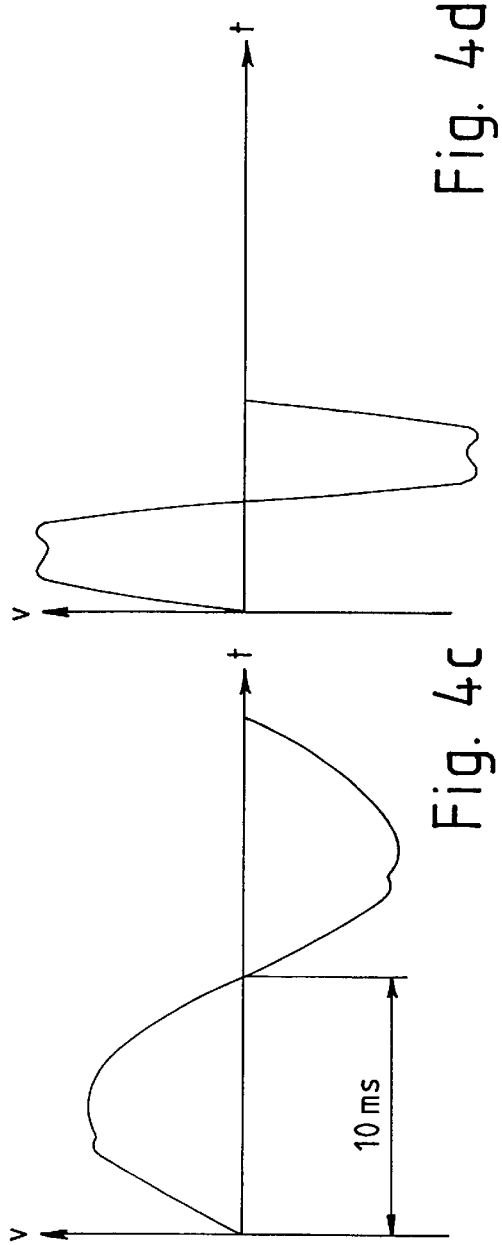
Fig. 4d
Fig. 4c

SAFETY METHOD AND DEVICE FOR FULL-VOLTAGE POWER SUPPLY TO A USER APPARATUS ONLY WHEN REQUIRED, AND CONTROL ASSEMBLY COMPRISING SUCH A SAFETY DEVICE

BACKGROUND OF THE INVENTION

The present invention relates to a safety method and device for full-voltage power supply to a user apparatus only when required for operation of same.

In particular, the user apparatus is an actuator unit of the type used for moving beds, arm-chairs and the like.

In the known art the necessity to avoid a user apparatus being connected to the mains when not in use has been felt, in order to eliminate the risk of accidental electrocution and reduce electric consumption to no purpose.

In the known art safety devices have been proposed which comprise a relay that under rest conditions causes insulation of the user apparatus from the mains. An appropriate circuit powers the relay when a suitable command in the user apparatus is operated. For example, this command may be accomplished by suitable connection of a control element already present in the user apparatus for controlling some proper functions of the latter. In order to be able to have the required electric power for activating the relay when the circuit is not connected to the mains, use of an electric battery or a great-capacitance capacitor that are charged during operation of the user apparatus has been proposed. EP-A-0 615 667 discloses an example of a safety device of this type.

Such a device however suffers from the drawbacks of being adapted for use only with an expressly designed user apparatus and of depending on a battery or a storage capacitor; as a result, there is an important cost and the risk that, due either to a long period of inactivity bringing about an inevitable discharge of the battery or capacitor or to the battery failure, the user apparatus cannot start operating when required. Furthermore, in addition to the normal power-supply connection, an additional electric connection between the safety device and the user apparatus is to be provided.

Safety devices powering the user apparatus through high impedances when normal operation is required have been also proposed. An increase in the voltage drop on the impedance indicates a current requirement by the user apparatus and causes operation of a relay short-circuiting the impedance and enabling full-power supply to the user apparatus. Such devices however cannot be employed in a satisfactory manner in the case of low-absorption user apparatuses or apparatuses having small absorption variations when powered to a sufficiently low voltage so as to eliminate electrocution risks. This, for example, occurs in the case of user apparatuses such as movement actuators for beds, arm-chairs or the like, in which the circuit portions of relatively high absorption are powered through relays that do not operate at much lower voltages than the rated voltages, and/or in which power supply takes place by means of step-down transformers and when the operating commands are disposed downstream of said transformers. In fact, in these cases, absorption variations at the user apparatus inlet, when said apparatuses are powered through sufficiently high impedances so that a satisfactory protection against electrocution is provided, become too much reduced and often uncertain and masked by normal noise present along the electric lines.

It is a general object of the present invention to obviate the above mentioned drawbacks by providing a safety method and device capable of enabling full power supply of a user apparatus only when needed, without requiring additional connections and modifications to the user apparatus and ensuring a correct operation even with user apparatuses powered through feeder transformers, and/or with small absorption variations when powered at sufficiently low voltages to ensure the absence of electrocution risks.

SUMMARY OF THE INVENTION

In view of the above object, in accordance with the invention, a method has been devised for detecting a condition requiring connection of a user apparatus to a mains or feeder line comprising the steps of powering the user apparatus to a low voltage through a detection impedance; detecting the waveform at the ends of the detection impedance; operating connection of the user apparatus to the feeder line when the waveform at the ends of the detection impedance is distorted in a manner that has been previously established to be caused by operation of a command in the user apparatus and requiring full powering of same.

In accordance with this method, a safety device has been conceived which powers a user apparatus with a full supply voltage when a condition that has been established to require this power supply is detected, characterized in that it comprises: a low-voltage source for powering the user apparatus, when in a rest condition, through a detection impedance; an analysis circuit detecting the waveform distortion at the ends of the detection impedance; a circuit for connecting the user apparatus to the feeder line, which circuit connects said user apparatus to the line when it receives a signal from the analysis circuit indicating that a distortion is present that has been pre-established to be due to an impedance variation in the user apparatus caused by operation of a command in the user apparatus and requiring full power supply of the latter.

Accomplishment of a control assembly has also been conceived which comprises the safety device and a user apparatus, in turn comprising at least one electromechanical actuator controlled by manual commands therein for movement of beds, arm-chairs or the like.

BRIEF DESCRIPTION OF THE DRAWINGS

For better explaining the innovatory principles of the present invention and the advantages it offers over the known art, a possible embodiment of the invention applying said principles will be given hereinafter by way of non-limiting example, with the aid of the accompanying drawings. In the drawings:

FIG. 4 shows waveforms detected under rest conditions and under conditions that have been established to require power supply of the user apparatus.

DETAILED DESCRIPTION OF THE INVENTION

Figure 1:
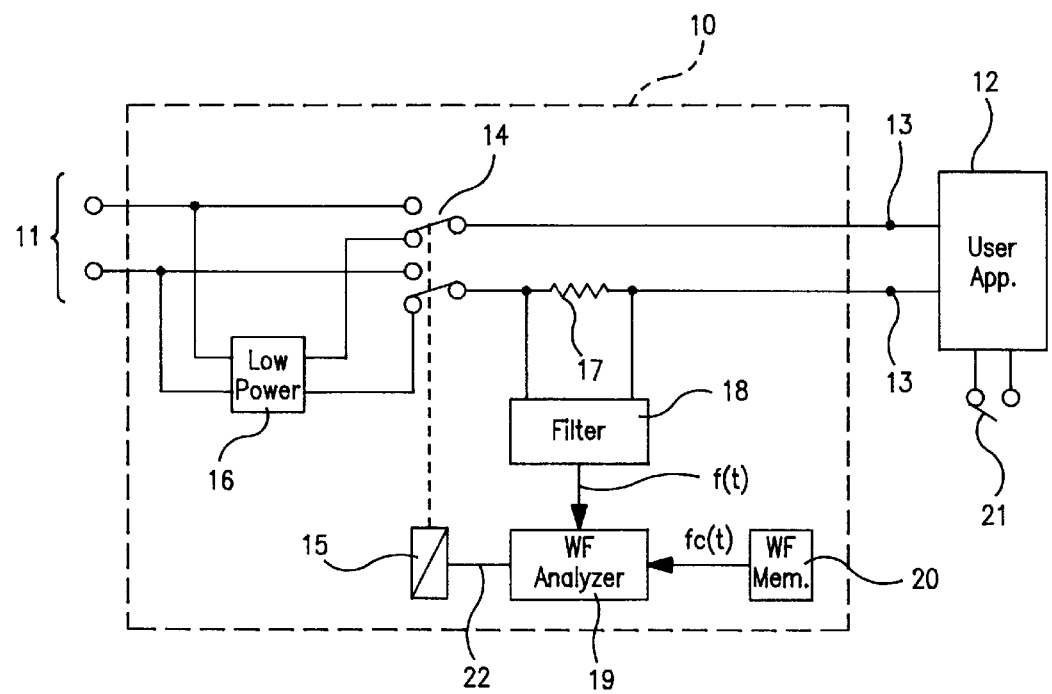
FIG. 1 shows a first block diagram of a safety circuit made in accordance with the invention, applied to a general user apparatus.

With reference to the drawings, shown in FIG. 1 is a first block diagram of a circuit, generally denoted by 10, applying the innovatory concept of the present invention.

Circuit 10 comprises an input 11 for connection to a full or high voltage mains for power supplying a user apparatus 12 such as a bed, arm-chair or the like, which is connected to an output 13. Contacts 14 of a relay 15 are present between input 11 and output 13. The user apparatus has at least one activation or switching-on command switch 21 of its own. Relay 15 has switching-over contacts 14 alternately connecting output 13 selectively high voltage to the line input 11 when the relay is activated, and to an output of a low-voltage source or power supply unit 16 when the relay is deactivated. By low voltage it is intended a voltage low enough not to represent an electrocution risk. The supply output provided by power supply 16 is advantageously galvanically separated from line 11 and the earth or ground reference of said line, so as to avoid a circuit closure possibility at potentially dangerous voltages. For example, the low-voltage power supply 16 can be made of a step-down transformer having a primary winding power supplied from line 11 itself and a secondary winding connected to contacts 14.

Downstream of contacts 14 and in series with the connection with the user apparatus 12, there is a detection impedance 17, made of a resistive element for example, so that at the ends of it a voltage drop occurs which is dependent on the instantaneous load absorption, the load being user 12.

The voltage drop on element 17 is sent to a filter block 18 (a low-pass filter, for example) at the output of which a waveform f(t) is present, which waveform depends on the user's impedance input features and the waveform of feeder line 11.

For instance, if the user apparatus 12 were a resistive load, f(t) would be a voltage of the same waveform as that of line 11 (a sine waveform, for example). Waveform f(t) is sent to an analyser block 19 detecting distortion of the waveform and consequently operating relay 15 on detection of a distortion that is pre-established to be due to a condition of the user apparatus requiring full power supply, as will be clearer in the following.

For instance, distortion detection can be carried out by the analyser circuit by comparing f(t) with reference waveforms fc(t) contained in a memory block 20. Contained in the memory block 20 are reference waveforms representing the conformation that the waveform f(t) takes when user 12 is activated and consequently when power supply at the mains voltage is required. The analyser circuit 19 continuously compares the detected waveform f(t) with the stored waveforms and, through an output of its own 22, actuates relay 15 when it detects that f(t) is modified to a mode corresponding to the one stored as being indicative of a power supply requirement from user 12.

In other words, the safety circuit 10 detects the waveform distortion on the sensor element 17 due to variation at terminals 13 of the user 12 impedance, owing to operation of the activation command 21 of the user apparatus.

Distortion can be a simple width variation, in the case of a resistive load, or a more complicated modification in the waveform conformation in the case of inductive and/or capacitive loads.

When distortion disappears, the analyser operates the relay for disconnecting the user from line 11 and connecting it again to the low-voltage source 16. For example, the analyser block 19 can be a known integrated DSP (Digital Signal Processor), specialised in digital processing of signals that can be easily envisaged by a person skilled in the art and therefore will not be further shown or described.

In the embodiment in FIG. 1, element 17 must have a sufficiently low impedance (ratio of applied voltage to current flow therethrough) not to excessively affect power supply coming from output 13 to user 12 when the user is fed at its full supply voltage 11 and under maximum-load conditions. However, when users with high variations between non-operating and operating conditions (as in the case of users containing electric motors or the like, for example) are involved, this fact leads to having signals of very small width on the sensor element 17 during the supply step through the low-voltage source 16.

This can be unacceptable under some conditions, although (unlike the known art) use of a waveform comparison enables a very precise detection to be made between noise and a real activation condition of user 12.

Figure 2:
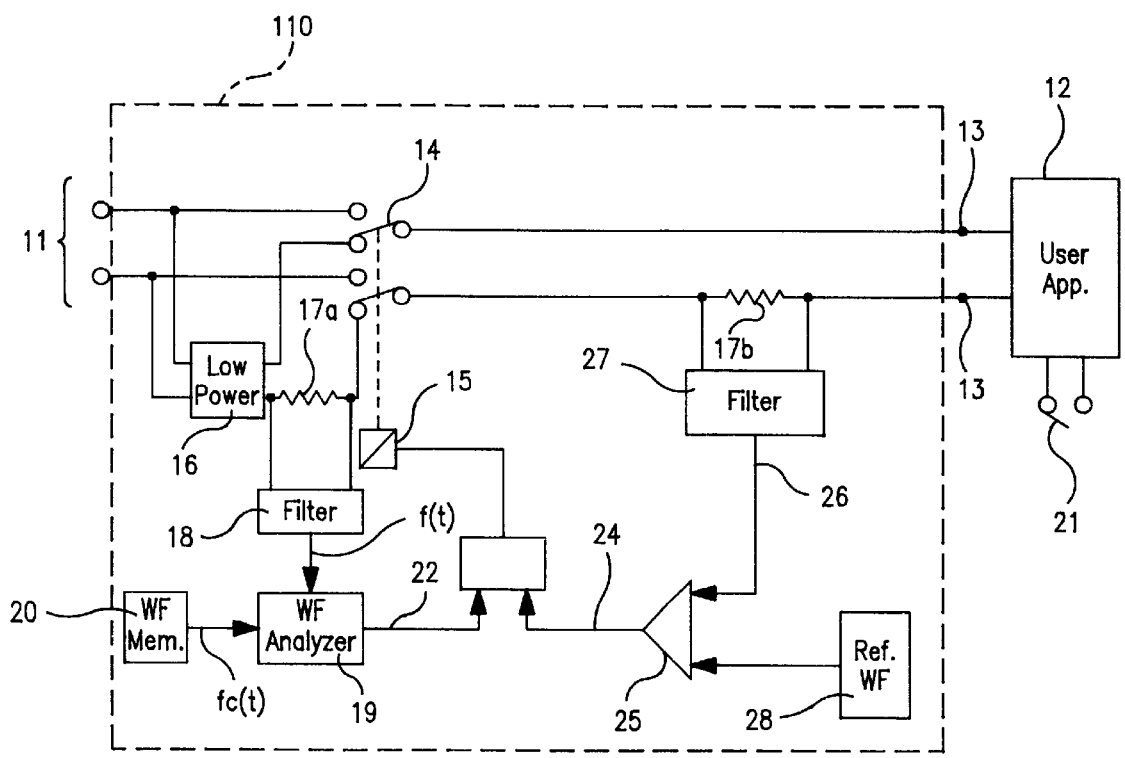
FIG. 2 shows a second block diagram of a safety circuit made in accordance with the invention.

Shown in FIG. 2 is an alternative embodiment 110 enabling detection of the waveform f(t) with a sufficient width without use of high impedances on the full-voltage feeder line of the user. In the diagram in FIG. 2, elements similar to those shown in FIG. 1 will be identified by the same reference numerals, for the sake of simplicity.

In the device 110, the detection impedance 17 of device 10 is replaced by two detection impedances 17a and 17b (two resistors, for example), one of which is disposed in series with the low-voltage power supply from source 16 and the other in series with the full-voltage power supply from line 11.

Impedance 17a will be sized so as to have a voltage drop at its ends sufficient for a correct detection when the user absorption is the one provided with a low-voltage power supply. Impedance 17b will be sized so as to have a voltage drop at its ends sufficient for a correct detection when the user absorption is the one provided with a full-voltage power supply, without producing an excessive difference between the input voltage 11 and the output voltage 13.

Unlike circuit in FIG. 1, the actuation output 22 of the analyser block 19 only operates activation of the relay, through the set input of a bistable circuit 23.

Deactivation of the relay is, on the contrary, controlled by the output 24 of a further comparison circuit 25 which is connected to the reset input of the bistable circuit 23.

The comparison circuit 25 at an input 26 receives the signal detected on element 17b and filtered by a (low-pass, for example) filter 27, and at the other input receives a reference signal issued from a reference source 28.

Should the absorption difference between a non-operating state and a normal-operation state of user 12 be high, comparator 25 can merely compare the waveform (or peak) width detected on element 17b with a corresponding value stored in or generated from source 28 and corresponding to the user apparatus absorption due to its maximum impedance when powered to the mains voltage and when its command 21 is activated.

Alternatively, source 28, similarly to block 20, can be a waveform memory block representing the waveform distortion detected at the ends of element 17b when the user is in operation, supplied to the normal operating voltage. Consequently, comparator 25 is a waveform analyser circuit, similar to circuit 19.

In other words, the analyser circuit 25 compares the detected waveform with sample waveforms that have been stored as being waveforms due to the maximum impedance of the user apparatus caused by operation of a command in the user apparatus, when powered at the feeder line voltage, and requiring power supply to be at the line voltage, and disconnection of the user device from the feeder line is operated when from comparison a waveform indicative of an impedance greater than said maximum impedance is detected.

In this way, a correct detection of the user states of non-operation, operation request, and return to a non-operating condition is ensured even when user 12 is subjected to wide impedance variations.

Figure 3:
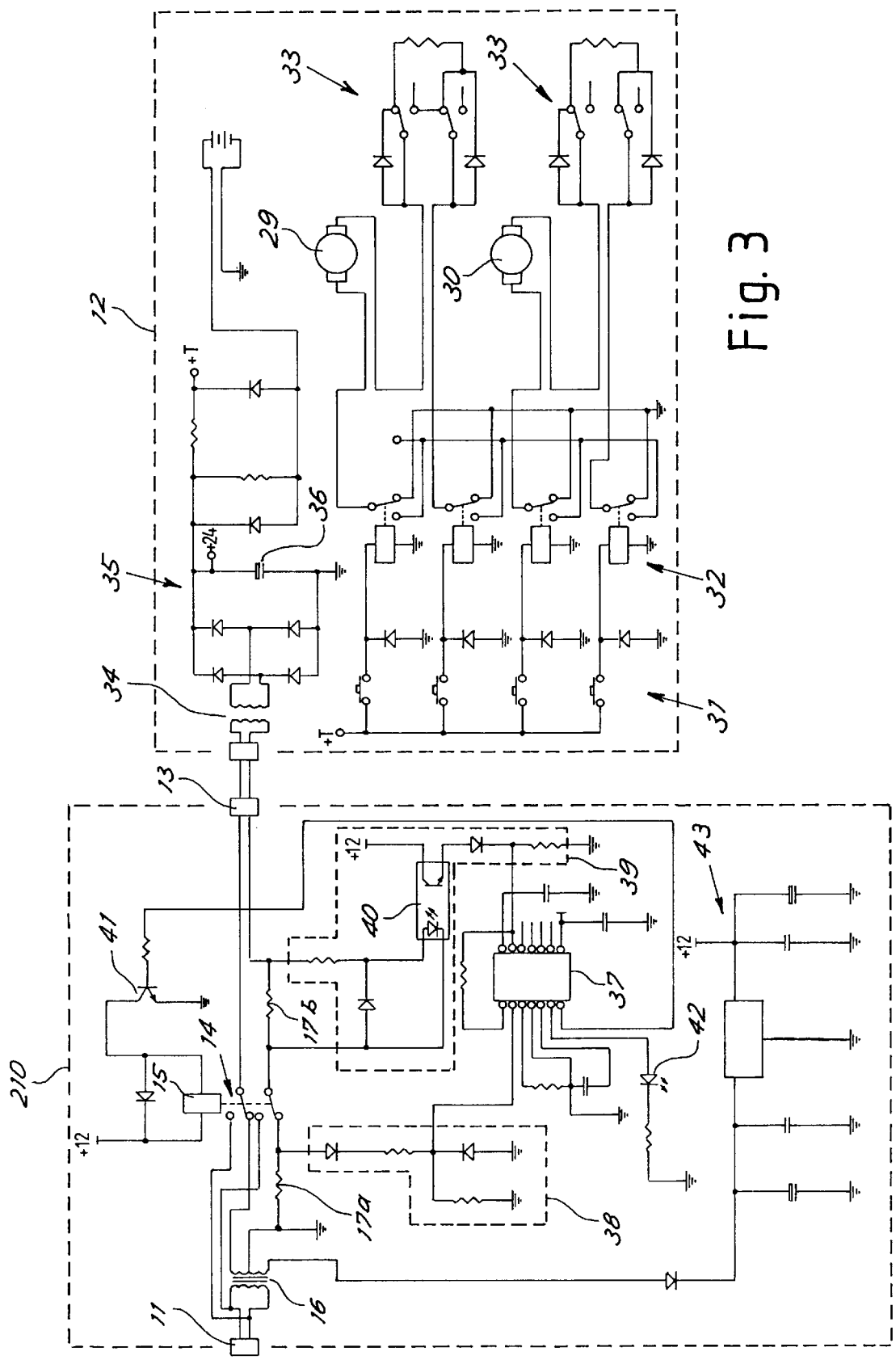
FIG. 3 shows a wiring diagram of a possible embodiment of the block diagram in FIG. 2.

Shown in FIG. 3 is a wiring diagram representing a practical embodiment of the diagram in FIG. 2.

In FIG. 3 the user apparatus 12 is advantageously embodied by an actuator for moving power-driven arm-chairs or beds. This user 12 comprises a plurality of motors (two, for example, denoted by 29, 30) operated by control push-buttons 31 through relays 32 and limit switches 33. The user apparatus comprises a feeder transformer 34 reducing voltage of line 11 to the operating voltage of the motors. As mentioned in the introductory part, the presence of transformer 34 would make it impossible to use a safety device of the known art connected to the only feeder line of the user apparatus.

On the contrary, with a safety device made in accordance with the invention, a minimum impedance variation on the transformer 34 primary winding caused by pushing any push-button 31 and, as a result, by connecting the coil of the corresponding relay 32 in parallel with the transformer 34 secondary winding, is correctly detected and it is sufficient for controlling connection of the user at the full voltage of line 11.

It is to note that voltage present on the transformer 34 secondary winding, when the primary winding is fed from source 16, is generally too low for activating relays 32. Therefore, motors are not connected and the impedance variation is only due to the connection of the coil of a relay 32 in parallel with the transformer 34 secondary winding, through a rectifier bridge 35, and with an equalising capacitor 36. This causes a minimum distortion to the waveform on resistor 17a, suddenly detected by the analyser circuit of the safety device 210.

For saving money in construction, the analyser circuit 19, memory 20, bistable circuit 23, comparator or analyser 25, reference source or memory 28 are made of a unique known integrated DSP, identified by 37 in FIG. 3.

The integrated DSP 37 also embodies part of filters 18 and 27, as can be easily understood by a person skilled in the art.

Between a first analysis input of the DSP 37 and the detection resistor 17a there is a net 38 for half-wave rectification and protection against overvoltages, whereas between a second analysis input of the DSP and the detection resistor 17b there is a net 39 for half-wave rectification and protection against overvoltages, also performing a de-coupling function of the electronic part of the safety device from the electric line 11 by means of an optical coupler 40. The DSP 37 controls the relay 15 through a transistor 41. A light emitting diode (LED) 42 can be provided for signalling an operating condition of the safety circuit 210.

The device 210 is powered from a voltage stabiliser stage 43 drawing power from an additional winding of the transformer 16 secondary winding.

Shown in FIG. 4a is an example of a waveform detected on resistor 17a when the user apparatus 12 is under rest conditions, that is when no push-button 31 is pushed. The DSP 37 considers this waveform as a rest condition and keeps relay 15 de-energised, so that a 48V voltage produced by the transformer 16 secondary winding reaches connector 13. This voltage undergoes a further reduction of about 5V by transformer 34.

When someone pushes a push-button 31 to operate a movement of actuator 12, the impedance variation on connector 13 causes the waveform to be distorted, as shown in FIG. 4b or 4c for example (with two different actuators). The DSP 37 detects this variation and compares it with the waveform stored therein. Since this waveform is stored as being a waveform valid for indicating the activation request of apparatus 12, the DSP operates activation of the relay. Voltage at the output 13 goes to the mains voltage (220V, for example) present at the input 11. Apparatus 12 is thus fully powered and can perform its normal activity. At the instant that a motor 29, 30 begins running, absorption or current flow on the line greatly increases and this causes a voltage drop at the end of resistors 17b. This voltage drop in turn actuates the optical coupler 40. The DSP 37 detects this situation and goes on keeping the relay 15 energised.

Shown in FIG. 4d is the waveform that can be detected at the ends of resistor 17b when the actuator 12 is powered at a full voltage and a push-button is pushed.

When the actuator reaches the end-of-stroke position or the push-button 31 is released, absorption lowers to values corresponding to idling of the user apparatus 12. The DSP after a pre-established delay, de-energises the relay 15, bringing power at the output 13 to the low-voltage rest value. The circuit is thus ready for a new intervention.

At this point it is apparent that the intended purposes have been achieved, by providing a safety device of sure operation with a great variety of user apparatuses and in particular well operating with electromechanical actuators having feeder transformers, such as those used for movement of arm-chairs and beds.

Obviously, the above description of an embodiment applying the innovatory principles of the present invention is given by way of example only and therefore must not be considered as a limitation of the inventive scope as claimed in the appended claims. For example, the electromechanical actuator may also comprise linear actuators or the like, in addition to motors 29, 30.

What is claimed is:

1. A method of detecting a condition requiring connection of a user apparatus to a feeder line voltage in response to a signal from the user apparatus, comprising the steps of:

connecting the user apparatus to a voltage source through a detection impedance wherein the voltage of said voltage source is lower than the voltage of said feeder line;

detecting the waveform produced by said source at the end of the detection impedance;

comparing the detected waveform with a predetermined waveform, and connecting the user apparatus to the higher voltage feeder line when the detected waveform at the ends of the detection impedance is distorted in comparison to said predetermined waveform.

2. A method as claimed in claim 1, in which distortion is detected by comparing the waveform on the detection impedance with at least one waveform that has been stored as being waveform due to detection impedance variation of the user apparatus caused by operation of a command in the user apparatus and requiring full powering of same.

3. A method as claimed in claim 1, in which maintaining connection of the user apparatus to the feeder line voltage is made through a second detection impedance and which method comprises the further steps of:

comparing the voltage drop on the second impedance with a reference value which has been established to correspond to operation of the user apparatus, when the apparatus is powered by the feeder line voltage, and operating disconnection of the user apparatus from the feeder line when a voltage drop value lower than said reference value is detected from such comparison.

4. A method as claimed in claim 1, in which maintaining connection of the user apparatus with the feeder line voltage is carried out through a second detection impedance and which method comprises the further steps of:

detecting the waveform at the ends of the second detection impedance;

comparing the waveform with a sample waveform that has been stored as being a waveform die to the maximum impedance of the user apparatus caused by operation of a command in the user apparatus, when powered to the feeder line voltage, and requiring powering of same at the line voltage; and operating disconnection of the user apparatus from the feeder line when a waveform indicative of a greater impedance than said maximum impedance is detected from such comparison.

5. A method as claimed in claim 1, in which the user apparatus is powered at a low voltage by a step-down transformer connected to said feeder line.

6. A method as claimed in claim 1, in which waveform comparisons are carried out by means of a DSP (Digital Signal Processor).

7. A safety device for supplying power to a user apparatus with a full supply voltage feeder line when a condition, that has been established to require this power supply, is detected, comprising a low-voltage source for powering the user apparatus, when in a rest condition, through a detection impedance;

an analysis circuit for comparing the waveform at the ends of the detection impedance with a predetermined waveform;

a further circuit for connecting the user apparatus to the feeder line when said further circuit receives a signal from the analysis circuit indicating that a distortion between the compared waveforms is present.

8. A safety device as claimed in claim 7, characterized in that said predetermined waveform comprises one or more sample waveforms that are stored in memory means and are pre-established to be waveforms resulting from the impedance variation of the user apparatus caused by operation of a command in the user apparatus and requiring full power supply of same.

9. A safety device as claimed in claim 7, characterized in that connection of the user apparatus by said further circuit to the feeder line is made through a second impedance and said further circuit comprises a comparator comparing the voltage drop on the second impedance with a reference value which has been established to correspond to the voltage drop due to the maximum impedance of the user apparatus caused by operation of a command in the user apparatus, when powered at the feeder line voltage, and requiring powering of same at the line voltage; said further circuit receiving a disconnection signal of the user apparatus from the feeder line when the comparator detects a voltage drop value lower than said reference value.

10. A safety device as claimed in claim 7, characterized in that connection of the user apparatus to the feeder line is made through a second impedance and in that it further comprises:

a second analysis circuit detecting the waveform at the ends of the second impedance and comparing this waveform with one or more sample waveforms that are stored in memory means and have been pre-established to be waveforms due to the maximum impedance of the user apparatus caused by operation of a command in the user apparatus, when powered at the feeder line voltage, and requiring power supply of same at the line voltage; the connecting circuit receiving a disconnection signal to disconnect the user apparatus from the feeder line when the second analysis circuit detects a waveform indicative of a greater impedance than said maximum impedance.

11. A safety device as claimed in claim 7, characterized in that the low-voltage source is accomplished by means of a step-down transformer connected to said feeder line.

12. A safety device as claimed in claim 7, characterized in that the connecting circuit comprises a relay with switching-over contacts between said feeder line and the low-voltage source.

13. A safety device as claimed in claim 7, characterized in that the analysis circuit comprises a DSP (Digital Signal Processor).

14. A safety device as claimed in claim 10, characterized in that connection between the second impedance and second analysis circuit is accomplished through an optical coupler.

15. A safety device as claimed in claim 10, characterized in that the connecting circuit comprises a relay with switching-over contacts between said feeder line and the low-voltage source, the first impedance being upstream of the switching-over contacts of the relay, and the second impedance being downstream thereof.

16. A control assembly in combination with the safety device as claimed in claim 7, and a user apparatus in turn comprising at least one electromechanical actuator operated by manual commands therein, for effecting movement of the, user apparatus.

17. A control assembly as claimed in claim 16, characterized in that the electromechanical actuator is controlled by the manual commands through corresponding relays.

18. A control assembly as claimed in claim 16, characterized in that the user apparatus comprises a step-down transformer for power supplying its inner circuits.

19. A control assembly as claimed in claim 18, characterized in that, on operation, the commands connect the corresponding relay in parallel with the transformer power supply winding.

* * * * *